United States Patent Office 2,736,715
Patented Feb. 28, 1956

2,736,715

MODIFIED STYRENE COMPOSITIONS

Henry Brunner, Langley, England, assignor to Imperial Chemical Industries Limited, a corporation of Great Britain No Drawing. Application January 28, 1952,
Serial No. 268,669

Claims priority, application Great Britain February 2, 1951

3 Claims. (Cl. 260—23)

This invention relates to improved interpolymers of styrene with a resin acid, or with a polyhydric alcohol ester thereof, and further to the use of such interpolymers in coating compositions.

By the term "resin acids" we mean a resin derived from a natural source, and containing at least one free carboxyl group in the molecule. Typical examples are rosin and tall oil and heat treated natural resins such as run congo. These materials as a result of their containing carboxyl groups may be esterified with a polyhydric alcohol to give products such as, for example, ester gum and congo ester.

Polystyrene itself is insoluble in drying oils, but solubility may be conferred by polymerising the styrene in the presence of a resin acid such as rosin.

According to the present invention a drying oil soluble styrene interpolymer is made by polymerising in the presence of a catalyst of the Friedel-Crafts type a mixture of styrene and a resin acid or polyhydric alcohol ester thereof, the proportion of styrene in the mixture being from 75 to 99% by weight. By the term "Friedel-Crafts catalyst" we mean such ionic compounds as are capable of catalysing the Friedel-Crafts reaction, for example, boron fluoride, stannic chloride, and aluminium chloride.

It has previously been proposed to polymerise a mixture of styrene and a resin acid in the presence of a peroxide type catalyst, but we have found that the polymerisation proceeds more quickly when using a catalyst of the Friedel-Crafts type. We have also found that interpolymers prepared in the presence of a Friedel-Crafts type catalyst show better compatibility with the drying oils and aliphatic solvents commonly used in coating compositions than do interpolymers prepared in the presence of peroxide type catalyst.

The compatibility characteristics of the interpolymers are also influenced by molecular weight and molecular weight distribution, and with the relatively high proportions of styrene used in the interpolymers of the present invention it is preferred that the polymerisation be carried out at a temperature of 100° C. or more, the upper limit being set by the reflux temperature of the mixture.

The polymerisation reaction may be carried out in the presence or absence of a solvent. When solvent is present the reaction is easier to control and further, more even distribution of molecular weight is obtained though the product may have a higher melting point than is the case when solvent is absent.

If the interpolymer is intended for use in an oleoresinous type resin composition, then the preformed interpolymers may be heated with a drying oil or semi-drying oil to produce a varnish. Alternatively, the drying oil or semi-drying oil may be added to the mixture of the styrene and resin acid, or ester thereof, prior to carrying out the interpolymerisation.

The styrene-resin acid interpolymers and the drying oil or semi-drying oil modifications thereof contain free carboxyl groups and thus they may be further modified by esterifying the free carboxyl groups either with a polyhydric alcohol or with a partial ester of a polyhydric alcohol and a fatty acid of a drying oil or a semi-drying oil.

The invention may be illustrated by the following examples in which parts are by weight.

Example 1

To a mixture of 2 parts of rosin dissolved by warming in 5 parts of styrene was added dropwise 2 parts of boron fluoride hydrate. The resulting exothermic reaction raised the temperature from 35° C. to 44° C. The mixture was then heated to 100° C. and a further 95 parts of styrene added between 100–110° C. over a period of 25 minutes. The resulting mixture was heated for a further hour at 100° C. and then distilled at 200° C., a stream of carbon dioxide being used to assist in the removal of catalyst. The yield of resin was 85 parts. It was a liquid resin, with acid value of 2.6 mgm. KOH per gm. and was found to be soluble in white spirit and linseed oil.

Example 2

A mixture of 2 parts of rosin and 2 parts of boron fluoride hydrate was dissolved in 20 parts of benzene and heated to 80° C. 100 parts of styrene were then added over a period of 20 minutes and the temperature allowed to rise until the mixture was gently refluxing at 105–112° C. After completion of the addition of the styrene the mixture was heated at 112° C. for an hour and then, with the assistance of a stream of carbon dioxide, freed from catalyst and solvent by distilling to 200° C. The residue was a brittle solid of melting point 39–48° C. as determined by the capillary tube method. The resin had an acid value of 2.5 mgm. KOH per gm. and was soluble in linseed oil and white spirit.

Example 3

A solution of 5 parts of ester gum in 100 parts of styrene was added dropwise to a stirred mixture of 2 parts of boron fluoride hydrate and 20 parts of benzene held at reflux temperature. As a result of the styrene addition, the reflux temperature of the resulting mixture rose from 78° C. to 116° C. After completion of the addition the mixture was refluxed for an hour and then slowly distilled to 200° C. when carbon dioxide was blown through the charge to assist in the final removal of catalyst and solvent. The residue was a light brown brittle resin melting at 46–53° C. as determined by the capillary tube method. It was soluble in white spirit and varnish linseed oil.

Example 4

The procedure in Example 3 was repeated using 20 parts of ester gum and 80 parts of styrene. The product (M. P. 43–49° C.) was a brown resin which differed from the previous product in being soluble in 30-poise linseed stand oil.

The reactions described in the above examples were completed in approximately two hours, whereas previously described reactions using peroxide catalyst require upwards of five hours.

What I claim is:
1. A process for producing a drying oil-soluble styrene interpolymer which comprises polymerizing, in the presence of a Friedel-Crafts catalyst, a mixture of styrene and a polyhydric alcohol ester of a resin acid, the proportion of styrene in the polymerized mixture being from 75% to 99% by weight.
2. A process for producing a drying oil-soluble styrene interpolymer which comprises polymerizing, in the presence of a Friedel-Crafts catalyst, a mixture of styrene and ester gum, the proportion of styrene in polymerized mixture being from 75% to 99% by weight.

3. An ester-forming process which comprises reacting (1) the interpolymer prepared by polymerizing in the presence of a Friedel-Crafts catalyst, a mixture of styrene and a resin acid, the proportion of styrene in the mixture being 75% to 99% by weight, with (2) a member of the group consisting of polyhydric alcohols and partial esters of polyhydric alcohols and fatty acids of drying and semi-drying oils.

References Cited in the file of this patent

UNITED STATES PATENTS

| | | |
|---|---|---|
| 1,942,531 | Barrett | Jan. 9, 1934 |
| 2,457,769 | Arvin et al. | Dec. 28, 1948 |
| 2,468,770 | Morris et al. | May 3, 1950 |
| 2,527,578 | Rummelsburg | Oct. 31, 1951 |